United States Patent [19]
Hata

[11] 3,948,464
[45] Apr. 6, 1976

[54] BI-DIRECTIONAL TAPE TRANSPORT APPARATUS

[75] Inventor: Koichi Hata, Sunnyvale, Calif.

[73] Assignee: American Videonetics Corporation, Sunnyvale, Calif.

[22] Filed: Nov. 25, 1974

[21] Appl. No.: 526,725

[52] U.S. Cl. .................................. 242/192; 242/210
[51] Int. Cl.$^2$ B65H 75/34; G03B 1/04; G11B 15/60
[58] Field of Search ................... 242/192, 200–204, 242/67.4, 210; 360/71, 73

[56] References Cited
UNITED STATES PATENTS
3,802,644   4/1974   Maiershofer .................. 242/192

*Primary Examiner*—Leonard D. Christian
*Attorney, Agent, or Firm*—Flehr, Hohbach, Test, Albritton & Herbert

[57] ABSTRACT

A simplified tape transport apparatus employs a pair of capstans each associated with one of the two rolls of tape in the transport. Means are provided for driving the two capstans to rotate their respective rolls to feed tape from the supply roll to the take-up roll. The driving means includes individual belts coupling a drive spindle with capstan support spindles so as to introduce a twist in the belts whereby their ends will naturally shift from one position to another axially of their respective supporting spindles in response to reversing the rotation of the drive spindle. In the foregoing manner, the ends of the belt associated with the capstan driving the take-up roll will normally be disposed about spindle portions which cause the take-up roll capstan to drive the take-up roll at a greater rate than the supply roll capstan drives the supply roll, thereby introducing tension into the tape. Upon reversing the drive spindle, however, the ends of the two belts shift axially on their supporting spindles so as to relocate the ends of the belts for operation by other spindle portions which serve to drive the newly designated take-up capstan at a rate greater than the newly designated supply capstan so as to tension the tape during reverse feeding of the tape. The foregoing action occurs as the natural result of the manner in which the belt is arranged.

6 Claims, 4 Drawing Figures

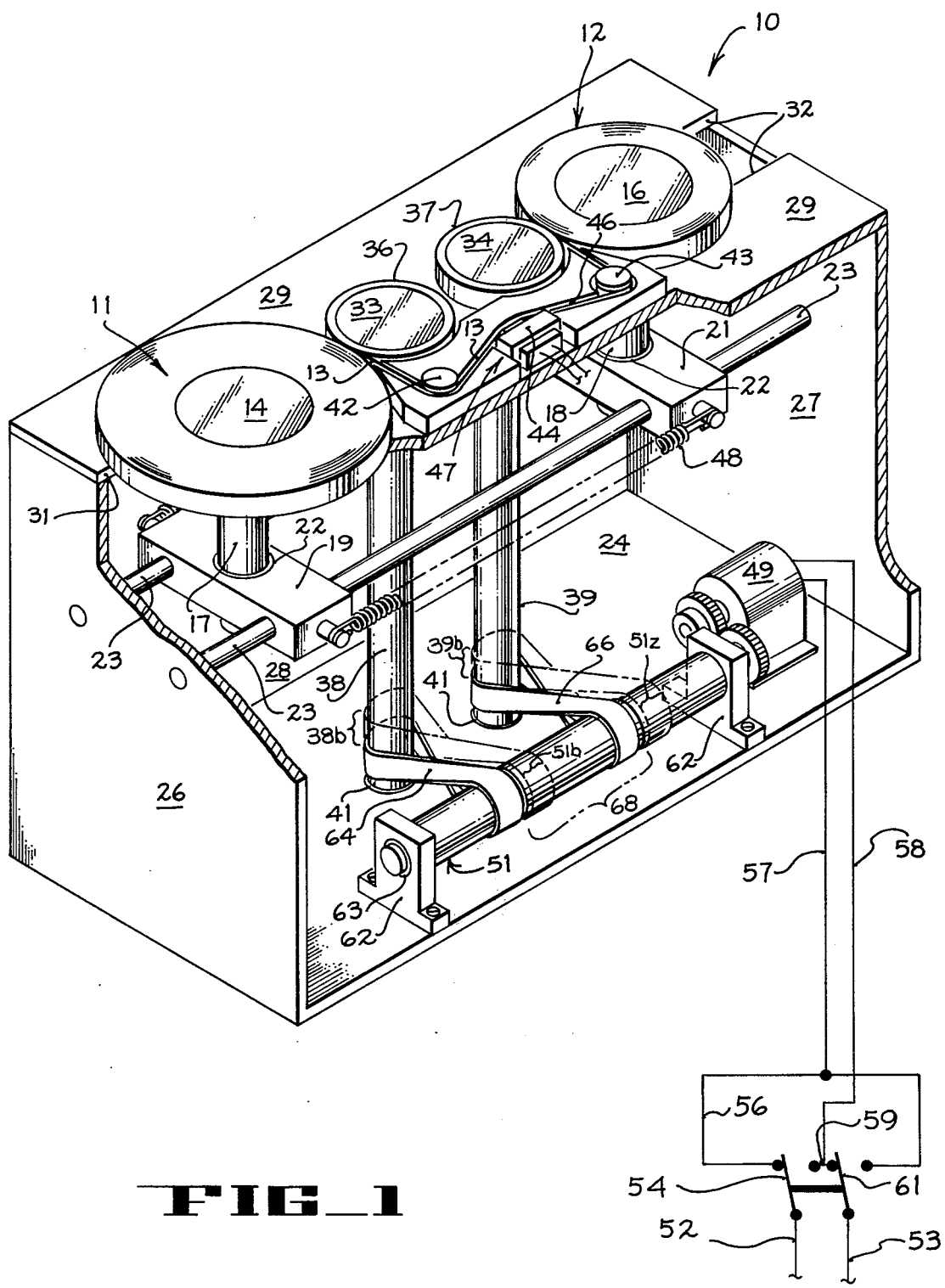
FIG_1

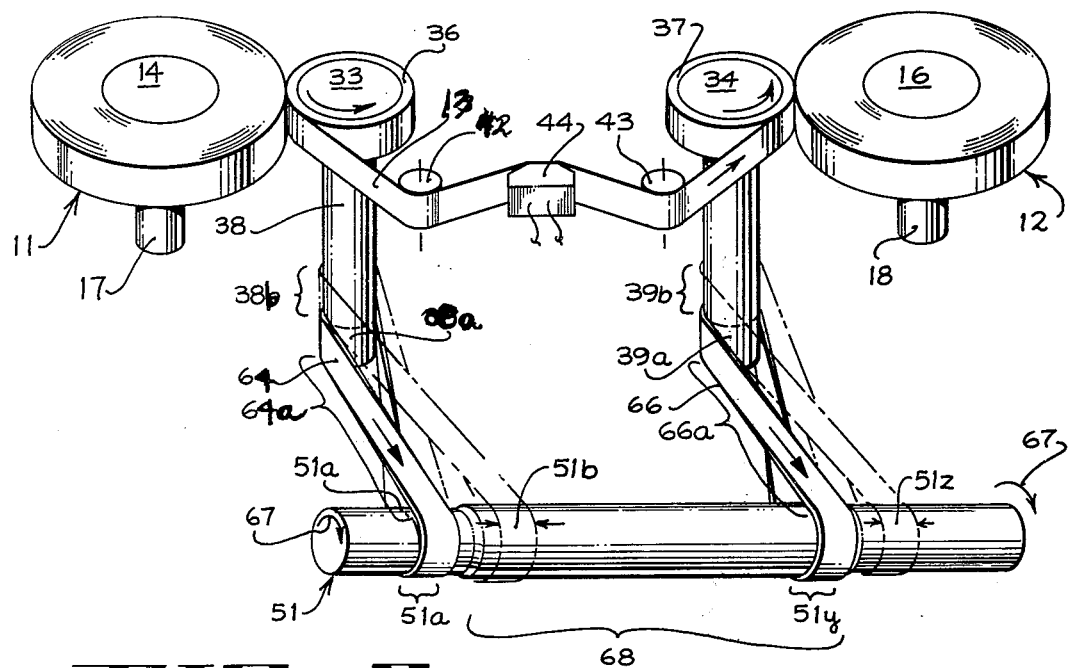
FIG_2
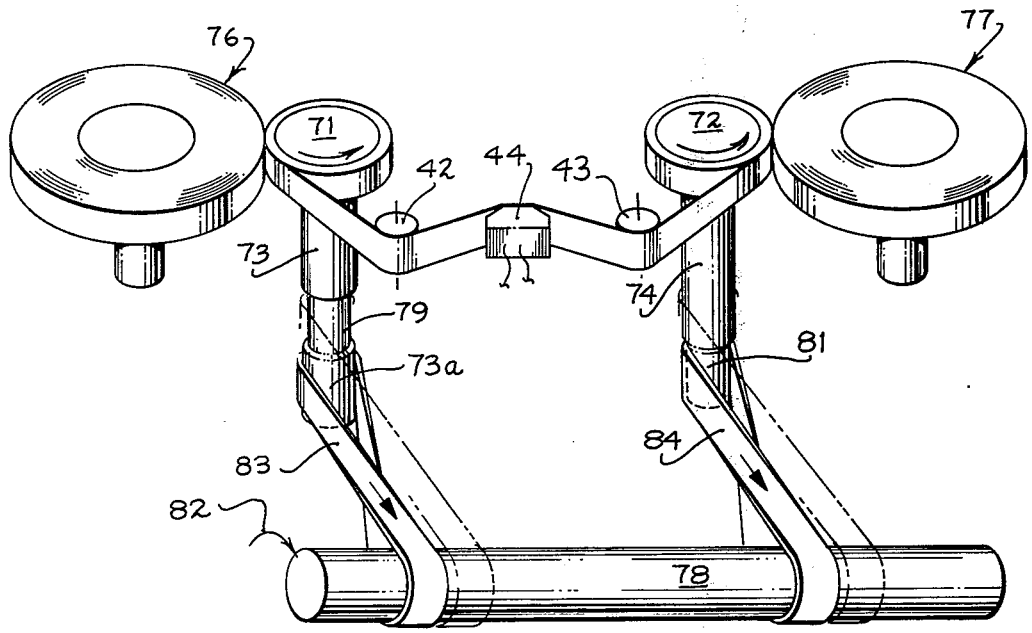
FIG_3

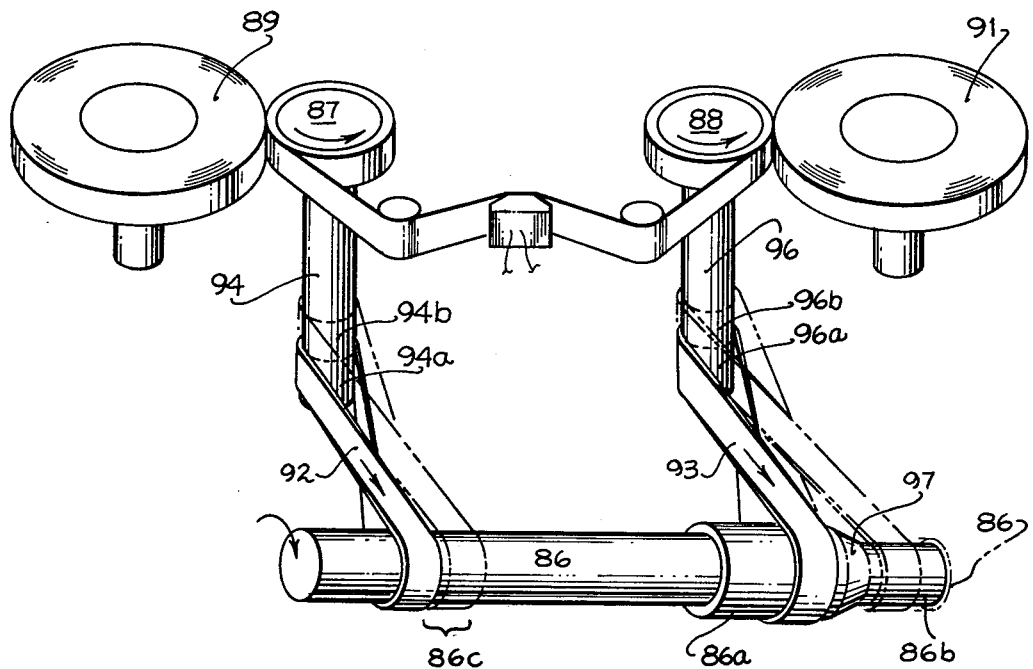
FIG_4

BI-DIRECTIONAL TAPE TRANSPORT APPARATUS

BACKGROUND OF THE INVENTION

This invention pertains to ribbon-feeding apparatus of the type for feeding a pliable ribbon wrapped to form supply and take-up rolls typically useful in feeding magnetic recording tape and photographic film. This invention more particularly pertains to a tape transport apparatus of the type in which tension is developed in the tape by driving the take-up roll to take on tape at a rate slightly greater than the rate of unwinding tape from the supply roll.

Heretofore, in tape transport apparatus of the kind described, separate motors have been applied to drive the supply and take-up rolls at different speeds in order to generate tension in the tape span defined between the two rolls. In other arrangements, brakes have been employed on the supply roll so as to cause it to resist unwinding as the tape is wrapped about the take-up roll by means driving the take-up roll. Other means for generating tension in the span of tape defined between supply and take-up rolls are shown in U.S. Pat. No. 3,370,803.

Heretofore, it has been a major objective to obtain a reversible tape transport in which energy is not consumed in the system such as results from using friction in the form of brakes and the like while still maintaining the system in as simple a form and inexpensive a form as possible.

As used herein, the term "tape" shall be deemed to mean any form of elongate, pliable ribbon of a type adapted to be wrapped to form rolls thereof, such as picture film and magnetic recording tape.

SUMMARY OF THE INVENTION AND OBJECTS

In general, there has been provided a tape transport apparatus of a type adapted to employ a length of record tape wrapped to form supply take-up rolls in which the transport includes first and second resilient annular rotating drive bodies for driving the rolls. Means are provided for supporting the rolls to advance and retreat relative to the bodies during winding and unwinding of the tape from one roll to the other. Both rolls are continuously urged toward their respective drive bodies so as to maintain engagement with the tape disposed between the bodies and the rolls. First and second spindles respectively support the drive bodies for rotation therewith while means for rotating the drive bodies in a common direction selectively in each of two opposite directions serves to feed the tape from one roll to the other and return. The last named means naturally serves to drive at a greater rate that one of the bodies disposed adjacent the roll which is winding the tape than the rate of rotation of the body disposed to drive the roll which is unwinding the tape so as to apply tension to that span of tape extending between the rolls, notwithstanding the direction of drive of the drive means.

In general, it is an object of the present invention to provide an improved and simplified bi-directional tape transport apparatus characterized by simplified means for inducing tension in the tape when the tape is fed in each of two directions.

The foregoing and other objects of the invention will be more readily evident from the following detailed description of preferred embodiments when considered in conjunction with the drawings.

BRIEF DESCRIPTION OF THE DRAWINGS

FIG. 1 shows a diagrammatic perspective view, partially broken away, of a tape transport apparatus according to the invention;

FIG. 2 shows a diagrammatic perspective view, in enlarged detail, of the drive means associated with the embodiment shown in FIG. 1;

FIG. 3 shows an enlarged diagrammatic perspective view of another embodiment of a drive means for use in conjunction with the apparatus shown in FIG. 1;

FIG. 4 shows an enlarged diagrammatic perspective view of another embodiment of a drive means for use in conjunction with the apparatus shown in FIG. 1.

DETAILED DESCRIPTION OF THE PREFERRED EMBODIMENTS

Tape transport 10 comprises supply and take-up rolls 11, 12 of an elongate record tape 13 wrapped about hubs 14, 16. Hubs 14, 16 are carried by shafts 17, 18 journalled in carriage blocks 19, 21 by means of the bearings 22.

A pair of spaced guide rails 23 or rods extend through blocks 19, 21 to permit blocks 19, 21 and their associated rolls 11, 12 to advance and retreat along the rods as the size of the rolls increases and decreases.

The transport as diagrammatically shown in FIG. 1 includes a bottom plate 24, end plates 26, 27, a back plate 28 and a top deck 29.

Deck 29 includes a pair of relatively wide slots 31, 32 serving to permit shafts 17, 18 to move therealong as carried by blocks 19, 21.

Capstans 33, 34 each carry a tire 36, 37 therearound for engaging the outer convolution of each of the two rolls 14, 16 respectively. Accordingly, tires 36, 37 each represent a rotatable, annular resilient drive body of a type for engaging and driving each of the two rolls. Spindles 38, 39 are supported for rotation by bearings such as the bearings 41 located in both the bottom plate 24 and the top deck 29.

Means for guiding the tape 13 from one roll to the other includes the two guide posts 42, 43, magnetic transducer 44 and a channel 46 formed in the channel block 47 secured to the top deck 29.

Means such as the springs 48 serve to draw the two blocks 19, 21 to move their associated rolls 11, 12 toward their respective capstans 33, 34 whereby rotation of capstans 33, 34 serves to feed the tape from supply roll 11 to take-up roll 12 and, as now to be described, means are provided serving to drive the take-up roll slightly faster than the supply roll so as to maintain tension in the tape as it moves across transducer 44.

Means for driving the capstans includes a drive motor 49 geared to drive a drive spindle 51 in each of two opposite directions by means of the electrical connections shown. Thus, a DC power supply coupled to the leads 52, 53 serves to connect to motor 49 via switch armature 54, lead 56 and connection 57, leading directly to motor 49. The return portion of the circuit is traced along connection 58 leading from motor 49 to the dual contacts 59 whereby switch armature 61 couples the return side to lead 53.

As is known, the direction of a DC motor such as 49 can be readily reversed by reversing the direction of application of current to the motor. This is readily achieved by switching armatures 54, 61 to the contacts which are shown as open contacts in FIG. 1 whereby power from lead 53 will be traced via lead 56 to connection 57 and return via connection 58 and armature 54 to lead 52.

Means such as the brackets 62 support drive spindle 51 for rotation in journal bearings 63 whereby the pair of belts 64, 66 driven by spindle 51 serves to rotate capstans 33, 34, as now to be described.

Drive spindle 51 includes a slightly enlarged central portion 68 shown with an exaggerated diameter in the drawing but serving to provide a sufficiently larger diameter whereby belt 66 will be driven slightly faster than belt 64 and, all else remaining the same as shown, capstan 34 will feed tape slightly faster than capstan 33. The direction of movement of belt 66 and 64 is such as to provide unwinding of roll 11 while capstan 34 serves to wind tape 13 about roll 12.

From the above, it should be evident that spindles 38, 39 are disposed in a common plane while spindle 51 is disposed transversely of the spindles while lying in a second plane substantially parallel to the plane of the spindles 38, 39.

Further, with the spindles 38, 39, 51 arranged as above belts 64, 66 are twisted so that each follows a cyclic path about an associated one of spindles 38, 39, then travels along a stretch 64a, 66a, the plane of which is twisted through an angle permitting the belt to pass around spindle 51 and return along a reverse stretch to pass around its associated capstan spindle 38, 39 to complete the cycle of belt movement.

Accordingly, each belt 64, 66 is thus disposed between supporting spindles in a manner responding to reversal of the rotation of drive spindle 51 by shifting its ends axially along the spindles supporting such ends.

Thus, as shown in FIG. 2, the opposite ends of each of the two belts are trained about predetermined belt drive portions underlying the belt as it rotates in the direction shown. Thus, on spindle 38 a first belt drive portion 38a underlies the moving belt 64 when spindle 51 is driven in a direction to feed tape from roll 11 to roll 12. On drive spindle 51 the surface underlying belt 64 constitutes a first belt drive portion 51a.

Similarly, with respect to spindle 39, the first belt drive portion 39a underlies belt 66 as it passes around spindle 39 in the position shown in full lines in FIG. 2, and spindle 51 provides an additional belt drive portion 51y underlying belt 66.

Belts 64, 66 of suitable elastomeric material are coupled respectively to drive spindles 38, 39. Each belt 64, 66 is twisted sufficiently to cause the ends thereof to shift from one axial belt driving position to another in response to reversing the direction of rotation of drive spindle 51. This axial shift of the ends of the belt serves to train each belt about different belt drive portions of the spindles at each end of the belt when the drive spindle rotates in one direction as compared to the portions about which the belts are trained when the drive spindle rotates in an opposite direction. Accordingly, as described above, FIG. 2 pertains to the condition in which drive spindle 51 rotates in the direction of arrow 67. Upon reversal of the rotation of spindle 51, the ends of belts 64, 66 carried on spindle 51 shift axially of spindle 51 to the right so as to occupy secondary belt drive portions 51b and 51z. The other ends of belts 64, 66 also move naturally upwardly along their respective capstan drive spindles 38, 39 to travel about drive portions 38b and 39b respectively, each located above the previous drive portions 38a, 38a.

The foregoing shifting of the ends of the belts between first and second drive positions is naturally derived from the nature of the movement of the cyclic belts oriented in the twisted style as shown. Thus, each belt 64, 66 is sufficiently twisted between drive spindle 51 at one end and an associated one of capstan spindles 38, 39 on the other end.

Spindle 51 includes an axially extending enlarged central portion 68 having a slightly enlarged diameter as compared to the diameter of the end portions of drive spindle 51. Accordingly, whenever one or the other of the two belts 64, 66 is disposed or trained about portion 68, it will rotate its associated drive capstan 33, 34 at a slightly greater rate than the other capstan.

Thus, as shown in FIG. 2 with drive spindle 51 rotating in the direction of arrow 67, drive capstan 33 is driven by belt 64 trained about drive portion 51a of spindle 51. The foregoing arrangement provides a predetermined rate of rotation and rate of feeding tape 13 from the interface defined between roll 11 and capstan 33.

On the other hand, belt 66, carried about belt drive portion 51y, serves to rotate capstan 34 slightly faster than capstan 33 whereby tape 13 will tend to be driven slightly faster at the interface between roll 12 and capstan 34 so as to introduce tension in that span of tape extending between roll 11 and roll 12.

Upon reversing the rotation of drive spindle 51, the ends of belt 64, 66 carried on spindle 51 will shift axially to the right to the phantom line position shown and the ends of belts 64, 66 carried about their respective capstan spindles 38, 39 will automatically move axially upwardly to the belt drive spindle portions 38b, 39b respectively. In view of the fact that the capstan spindles 38, 39 are of uniform diameter, the change in position of the belt ends therelong makes no difference in the driving of the rolls. However, the axial shifting of those ends of belts 64, 66 carried by spindle 51 to the new positions 51b, 51z in response to reversing the direction of feeding of the respective capstans 33, 34 causes capstan 33 (now on the wind-up side) to feed tape 13 onto roll 14 slightly faster than capstan 34 feeds tape from roll 16 thereby introducing tension into the tape.

According to another embodiment of the invention shown in FIG. 3, capstans 71, 72 comparable to capstans 33, 34 and disposed upon capstan drive spindles 73, 74 serve to rotate rolls 76, 77.

Drive spindle 78 is formed of a uniform diameter throughout its length but capstan spindles 73, 74 each include drive portions 79, 81 of relatively reduced diameter.

As shown in FIG. 3, when spindle 78 is driven in the direction of arrow 82, belts 83, 84 take the positions shown wherein the ends supported by capstan spindles 73, 74 are disposed respectively on the larger belt drive portion 73a and smaller belt drive portion 81. In this way, belt 84 serves to drive capstan 72 slightly faster than belt 83 is capable of driving capstan 71 so as to introduce tension into the tape extending between rolls 76, 77.

Similarly, as with respect to the embodiment of FIG. 2, reversal of the drive of spindle 78 causes a shift axially of both ends of each belt along its respective supporting spindles so that ends of belts 83, 84 each move axially to their phantom line positions shown so as to cause capstan 71 to be driven slightly faster than capstan 72 in feeding tape from roll 77 back to roll 76.

As shown in FIG. 4, yet another embodiment of the invention is disclosed in which a change in the direction of rotation of the drive spindle 86 automatically causes the supply roll to become a take-up roll and the take-up roll to become the supply roll and also automatically reverses the tension in the span of tape extending between rolls 89, 91 by driving that one of the two capstans 87, 88 located adjacent the winding roll at a greater rate than the other capstan rotates the unwinding roll.

In FIG. 4, belts 92, 93 are coupled in a manner suggested in the above embodiments for rotating the capstan spindles 94, 96. Drive spindle 86 includes two drive portions 86a, 86b. The diameter of drive portion 86a is greater than the diameter of drive spindle 86 at its left end (as shown), while drive portion 86b has a diameter which is smaller.

Accordingly, since capstan support spindles 94, 96 are of uniform diameter throughout their lengths and, in view of the fact that the belt drive portion 86c has the same diameter as the belt drive portion underlying belt 92 in the position shown, capstan 87 will always be driven at the same speed, notwithstanding reversal of the rotation of drive spindle 86.

However, when winding tape onto roll 91, the rate of rotation of capstan 88 will be greater than that of capstan 87. When unwinding tape from roll 91, the rate of rotation of capstan 88 will be less than the rate of rotation of capstan 87.

In operation, reversal of the drive of spindle 86 serves to shift the opposite ends of both belts 92, 93 in the manner disclosed above, namely the ends of belts 92, 93 disposed about spindle 86 shift to the right to respectively occupy belt driving portions 86c and 86b, while the other ends of the belts occupy belt driving portions 94b and 96b as opposed to the portions 94a, 96a underlying belts 92, 93 as shown.

In the embodiment shown in FIG. 4, the difference in diameter between portions 86a, 86b forms a substantial step. In order to aid in permitting the end of belt 93 to transfer from one portion 86b to 86a, the interface between portions 86a, 86b has been tapered to provide the inclined surface 97.

As above, belts 92, 93 are of a suitable elastomeric material such as rubber suitable to enhance engagement with their respective spindles and, in the case of belt 93, to accommodate the change in spindle diameter.

While the foregoing embodiments are shown in conjunction with tape transports of a type employing capstans riding in direct contact with the supply and take-up rolls, the principle of the foregoing invention is readily applicable to standard tape transports in which a stretch of tape is engaged between a pinch roller and a resilient idler roller for driving the tape in one or the other of two directions.

From the foregoing, it should be readily evident that there has been provided a relatively simple arrangement for introducing tension into a length of tape of a tape transport.

I claim:

1. In a tape transport apparatus of a type adapted to employ a length of record tape wrapped to form supply and take-up rolls, said tape transport apparatus comprising first and second rotating drive bodies for engaging and driving said rolls, means for supporting said rolls to advance and retreat relative to said bodies during unwinding and winding of said tape from one roll to the other, means yieldingly urging said rolls toward said bodies for engaging said tape therebetween to feed tape between said rolls, first and second spindles respectively supporting said first and second drive bodies for rotation therewith, means coupled to rotate said spindles to rotate said drive bodies in a common direction selectively in each of two opposite directions for feeding tape from one roll to the other and return, the last named means being common to both said spindles and naturally serving to rotate at a greater rate of rotation that one of said spindles disposed to drive the roll which is winding the tape than the rate of rotation of the spindle disposed to drive the roll which is unwinding the tape so as to apply tension to that span of tape extending between said rolls.

2. In a tape transport apparatus of a type adapted to employ a length of record tape wrapped to form supply and take-up rolls, said tape transport apparatus comprising first and second rotating drive bodies for engaging and driving said rolls, means for supporting said rolls to advance and retreat relative to said bodies during unwinding and winding of said tape from one roll to the other, means yieldingly urging said rolls toward said bodies for engaging said tape therebetween to feed tape between said rolls, first and second spindles respectively supporting said first and second drive bodies for rotation therewith, means for rotating said drive bodies in a common direction selectively in each of two opposite directions for feeding tape from one roll to the other and return, the last named means naturally serving to drive at a greater rate of rotation that one of said bodies disposed to drive the roll which is winding the tape than the rate of rotation of the body disposed to drive the roll which is unwinding the tape so as to apply tension to that span of tape extending between said rolls, the last named means comprising a rotatable drive spindle and a pair of belts coupled thereto, said belts also being coupled respectively to said first and second spindles, each said belt being twisted sufficiently to cause the ends thereof to shift axially from one belt drive portion of the spindles to another in response to reversing the direction of rotation of said drive spindle so as to train each belt about different belt drive portions of the spindles when said drive spindle rotates in one direction as compared to the portions about which said belts are trained when said drive spindle rotates in an opposite direction.

3. In a tape transport apparatus of a type adapted to employ a length of record tape wrapped to form supply and take-up rolls, said tape transport apparatus comprising first and second rotating drive bodies for engaging and driving said rolls, means for supporting said rolls to advance and retreat relative to said bodies during unwinding and winding of said tape from one roll to the other, means yieldingly urging said rolls toward said bodies for engaging said tape therebetween to feed tape between said rolls, first and second spindles respectively supporting said first and second drive bodies for rotation therewith, means for rotating said drive bodies in a common direction selectively in each of two opposite directions for feeding tape from one roll to the other and return, the last named means naturally serving to drive at a greater rate of rotation that one of said bodies disposed to drive the roll which is winding the tape than the rate of rotation of the body disposed to drive the roll which is unwinding the tape so as to apply tension to that span of tape extending between said rolls, the last named means comprising a rotatable drive spindle, means for rotating said spindle in opposite directions, first and second belts each coupled between said drive spindle and said first and second spindles respectively and disposed to respond naturally to reversal of the rotation of said drive spindle by shifting its ends axially along the spindles supporting such ends between first and second spindle portions, the first spindle portions having diameters serving to cause said first belt to rotate said first body at a greater rate than said second belt rotates said second body when said drive spindle rotates in one direction, and the second spindle portions having diameters serving to cause said second belt to rotate said second body at a greater rate than said first belt rotates said first body when said drive spindle rotates in a direction opposite to said one direction.

4. In a tape transport apparatus of a type employing a length of pliable record tape adapted to be wrapped to form supply and take-up rolls, said tape transport apparatus comprising first and second rotating tape drive bodies, means supporting both said supply and take-up rolls for reversible rotation each in two opposite directions and to respectively advance and retreat with respect to an associated one of said bodies during unwinding and winding of tape off of and onto the roll, means urging said rolls into engagement with an associated one of said bodies for engaging tape therebetween, first and second spindles supported to rotate respectively with said first and second bodies, said spindles being disposed substantially in a first plane, a third rotatable spindle for driving said first and second spindles and disposed transversely of said first and second spindles in a second plane substantially parallel to said first plane, means for rotating said drive spindle in each of two opposite directions, belts coupled between said drive spindle and said first and second spindles for driving each of said first and second spindles in both of two opposite directions for feeding the tape in opposite directions between the supply and take-up rolls, said belts being twisted to follow a cyclic path about an associated one of said first and second spindles then to travel along a stretch the plane of which is twisted through an angle permitting the belt to pass around said third spindle and return along a stretch twisted sufficiently to permit the belt to pass around said associated spindle to complete the cycle of belt movement, each belt being disposed between spindles so as to respond to reversal of the rotation of said third spindle by shifting its ends axially along the spindles supporting such ends, the spindles associated with each belt having first driving and driven portions of predetermined diameter serving to define the rate of rotation of their associated drive body when rotating said third spindle in one direction and having second driving and driven portions adjacent said first driving and driven portions serving to carry an associated one of said belts when the ends thereof are axially shifted along said spindles and to define the rate of rotation of their associated drive body when rotating said third spindle in an opposite direction, said driving and driven portions serving to provide a greater rate of rotation for that drive body serving to drive the take-up roll when said third spindle rotates in the direction which feeds tape to the take-up roll and upon reversal of said third spindle to drive the tape from the take-up roll back to the supply roll and then to rotate the drive body associated with the supply roll at a greater rate than the other drive body.

5. In a tape transport apparatus of a type employing a length of pliable record tape adapted to be wrapped to form supply and take-up rolls, said tape transport apparatus comprising first and second rotatable tape drive bodies, means supporting both said supply and take-up rolls for reversible rotation each in two opposite directions and to respectively advance and retreat with respect to an associated one of said bodies during unwinding and winding of the tape off of and onto the roll, means urging said rolls into engagement with an associated one of said bodies for engaging tape therebetween, first and second spindles supported to rotate respectively with said first and second bodies, said spindles being disposed substantially in a first plane, a rotatable drive spindle transverse to said spindles in a second plane substantially parallel to said first plane, means for rotating said drive spindle in each of two opposite directions, belts coupled between each of said first and second spindles and said drive spindle, each said belt being twisted to follow a cyclic path around a portion of one of said first and second spindles then to travel along a stretch the plane of which is twisted through an angle permitting the belt to pass around a portion of said drive spindle and return along a stretch twisted sufficiently to permit the belt to pass around said first or second spindle to complete the cycle of movement of the belt, said drive spindle having a portion of predetermined diameter supporting one of said belts and an enlarged portion supporting the other belt, said drive spindle having first and second drive portions respectively of smaller and larger diameter for each belt, said portions being disposed adjacent one another, one of said belts being trained about one of said smaller drive portions and the other belt being trained about one of the said larger drive portions during rotation of said drive spindle in one direction so as to rotate one drive body faster than the other and upon reversal of said drive spindle both belts being arranged to move naturally along said drive spindle so as to shift said one belt onto said larger portion and said other belt onto said smaller portion so as to rotate said other drive body faster than said one drive body.

6. In a tape transport apparatus of the type adapted to employ a length of record tape wrapped to form supply and take-up rolls, said tape transport apparatus including at least one drive capstan for engaging the tape to feed same selectively in each of two opposite directions, a spindle supporting said capstan for rotation in opposite directions, a drive spindle, a cyclic belt trained about both said spindles to engage first belt drive portions of each, said first portions defining the position of said belt for driving said capstan at a first rate, second belt drive portions on said spindles serving to define the position of said belt for driving said capstan at a second rate and in an opposite direction to that of said first rate, said drive spindle being spaced from said capstan spindle and disposed at an angle transversely of the axis of said capstan spindle so as to twist the reaches of said belt extending between said spindles in a manner serving to cause the ends of said belt to shift axially of said spindles to engage said second belt drive portions of each spindle in response to reversal of said spindles, and means for reversing the direction of rotation of one of said spindles to changes the direction and rate of rotation of said capstan and movement of said tape driven by said capstan.

* * * * *